United States Patent
Suzuki et al.

(10) Patent No.: US 7,281,078 B2
(45) Date of Patent: Oct. 9, 2007

(54) BANK STRUCTURE STORAGE CONTROL DEVICE AND PAPER MATTER AUTHENTICATION DEVICE

(75) Inventors: Yasumasa Suzuki, Sagamihara (JP); Kosuke Masuda, Sagamihara (JP)

(73) Assignee: Japan Cash Machine Co., Ltd. (JP)

( * ) Notice: Subject to any disclaimer, the term of this patent is extended or adjusted under 35 U.S.C. 154(b) by 141 days.

(21) Appl. No.: 10/491,463

(22) PCT Filed: Jun. 11, 2003

(86) PCT No.: PCT/JP03/07432

§ 371 (c)(1),
(2), (4) Date: Mar. 31, 2004

(87) PCT Pub. No.: WO03/104995

PCT Pub. Date: Dec. 18, 2003

(65) Prior Publication Data

US 2004/0243497 A1     Dec. 2, 2004

(30) Foreign Application Priority Data

Jun. 11, 2002   (JP)   ................. 2002-169764

(51) Int. Cl.
    *G06F 12/06* (2006.01)
(52) U.S. Cl. .................... 711/5; 711/102; 711/104; 705/35; 705/45; 382/135; 382/162
(58) Field of Classification Search ............... None
    See application file for complete search history.

(56) References Cited

U.S. PATENT DOCUMENTS

| | | | | |
|---|---|---|---|---|
| 4,368,515 A * | 1/1983 | Nielsen | ...................... | 711/212 |
| 4,432,067 A * | 2/1984 | Nielsen | ...................... | 463/44 |
| 5,226,136 A * | 7/1993 | Nakagawa | ................... | 463/44 |
| 5,255,382 A * | 10/1993 | Pawloski | ...................... | 711/2 |
| 5,652,803 A * | 7/1997 | Tachikawa et al. | ......... | 382/135 |
| 6,011,745 A * | 1/2000 | Okamura | ............... | 365/230.03 |
| 6,307,806 B1 * | 10/2001 | Tomita et al. | .............. | 365/233 |

* cited by examiner

*Primary Examiner*—Kaushikkumar Patel
(74) *Attorney, Agent, or Firm*—Bachman & LaPointe, P.C.

(57) ABSTRACT

A storage control device of bank structure is provided which comprises a CPU 1 and a storage 2 connected to CPU 1. Storage 2 detects and temporarily holds one of the bank addresses 0DF00h-7DF07h of the bank memories 9 to be read out next by CPU 1 when one of the bank memories 9 is read out by CPU 1 so that storage 2 supplies the held bank address 0DF00h-7DF07h to a memory control device 3 which thereby is switched to a next bank memory when CPU 1 produces a next retrieval signal. Accordingly, CPU 1 of small capacity reads information from storage of larger capacity to operate a controlled system connected to CPU 1 of the storage control device.

9 Claims, 5 Drawing Sheets

Fig. 3 (PRIOR APT)

BANK STRUCTURE STORAGE CONTROL DEVICE AND PAPER MATTER AUTHENTICATION DEVICE

TECHNICAL FIELD

The present invention relates to a storage control device of bank structure in particular of the type capable of operating a controlled system connected to and by a small capacity central processing unit in accordance with information retrieved from a large capacity storage to the central processing unit, more specifically a storage control device of bank structure and an apparatus for validating valuable papers with a central processing unit connected to a small capacity memory exchangeable for a large capacity storage for alteration or expansion of control program.

BACKGROUND OF THE INVENTION

Figure 4:
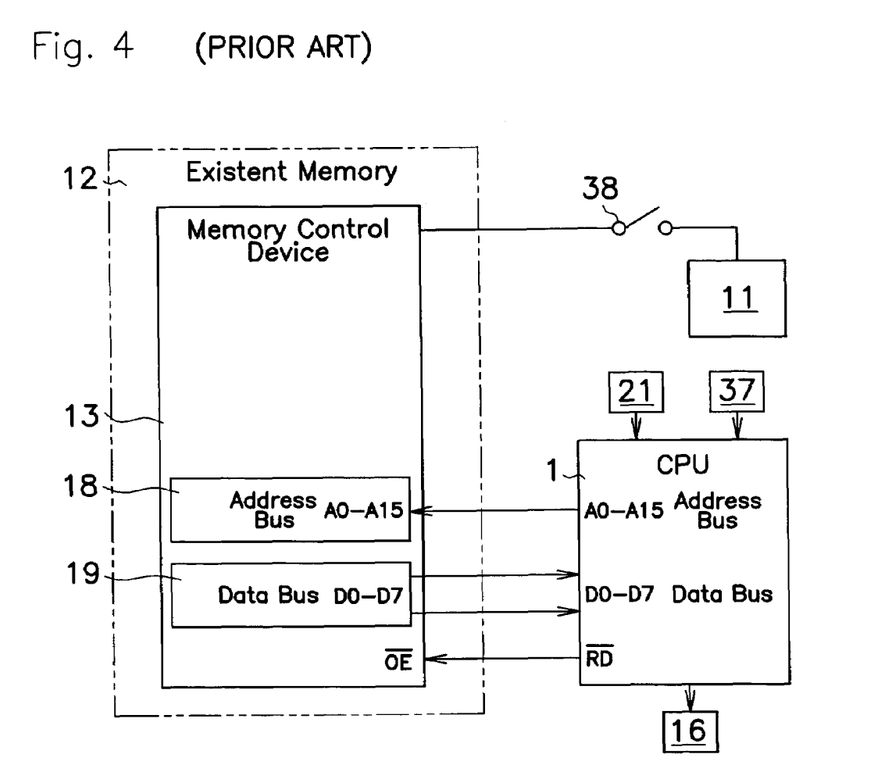
FIG. 4 is a block diagram of a prior art memory device.
Figure 5:
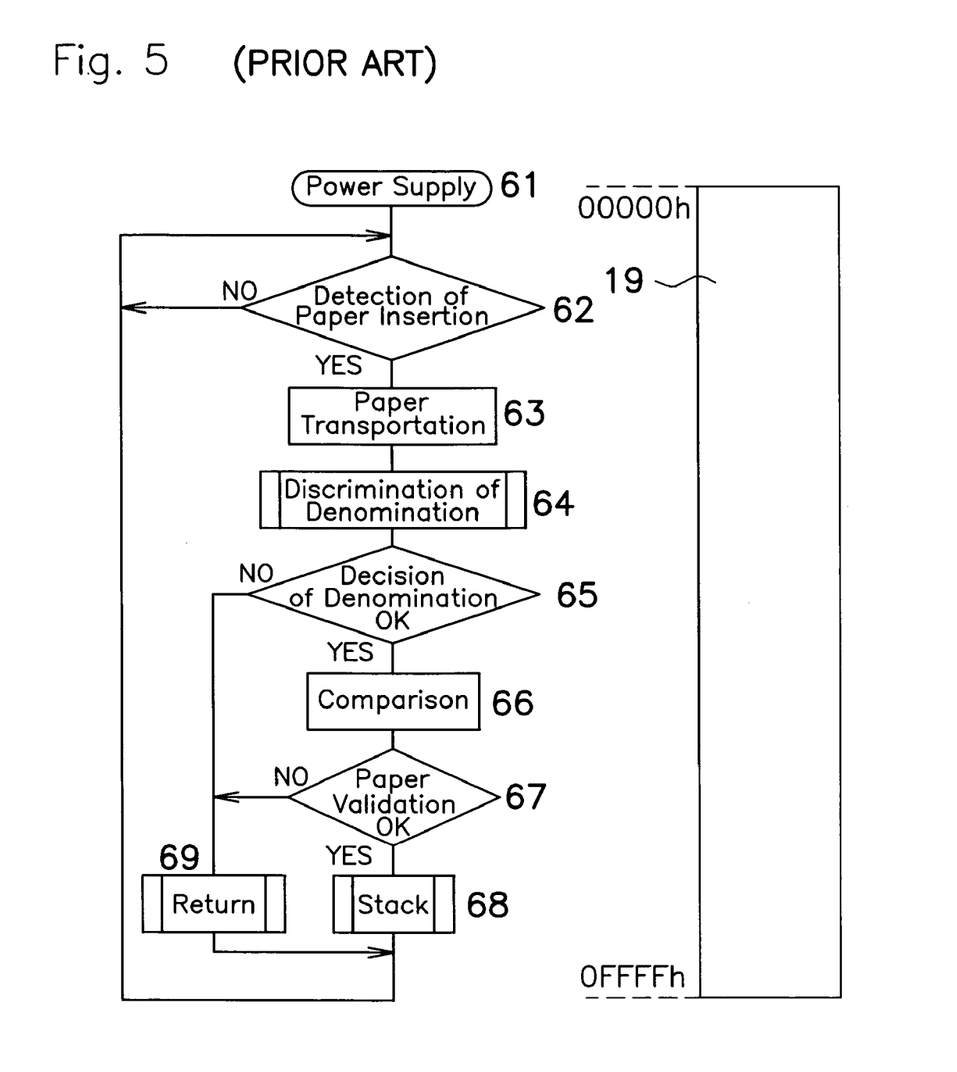
FIG. 5 is a flow chart showing an operational sequence of a prior art apparatus for validating valuable papers.

Lots of current industrial fields have been utilizing electronic memory devices for storing information and central processing units (CPUs) for reading information from the memory devices to process necessary functions. For example, FIGS. 3 to 5 illustrate an apparatus that comprises a memory and a CPU to discriminate or validate valuable papers such as bills or coupons.

Figure 3:
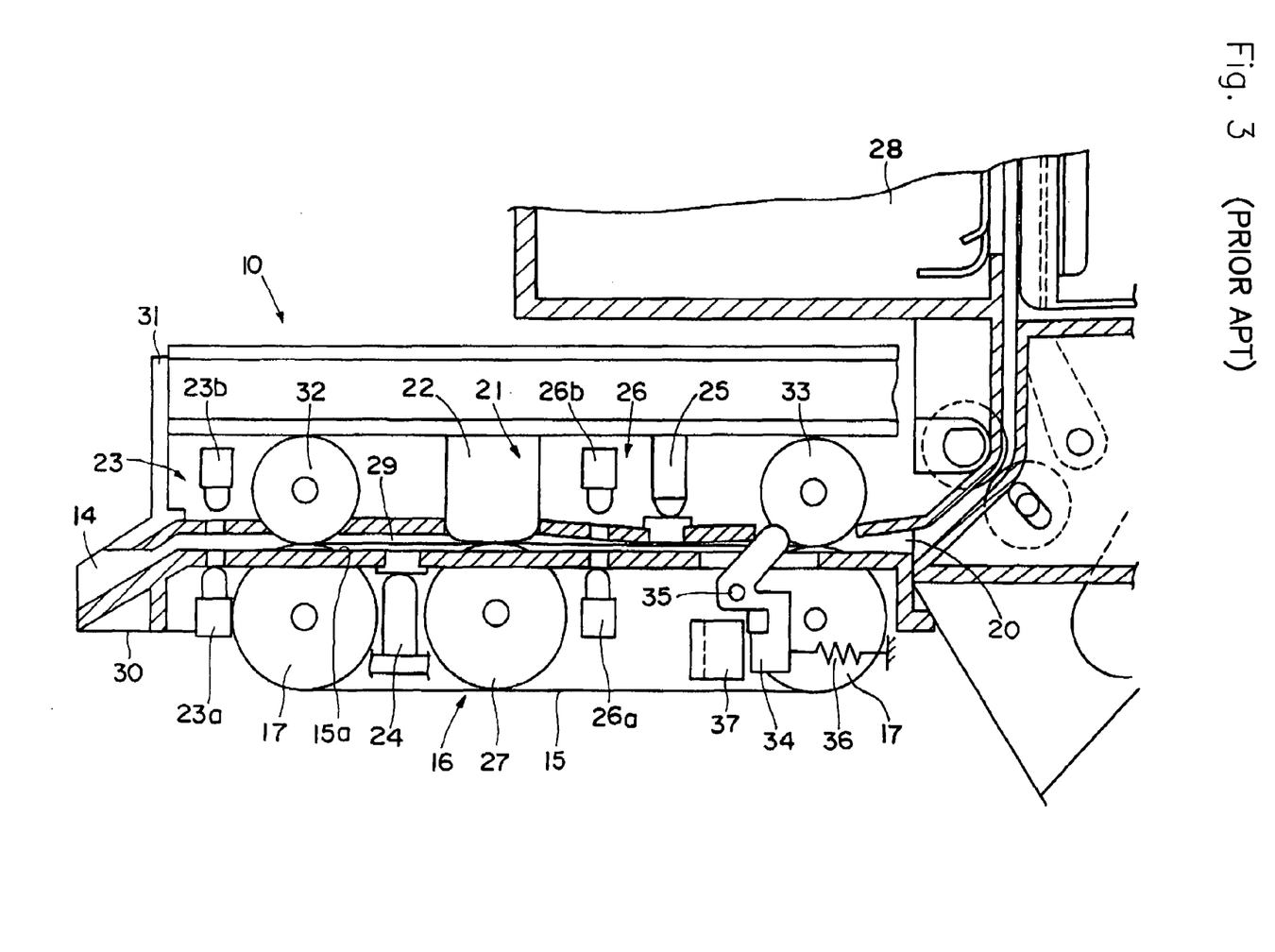
FIG. 3 is a sectional view of an example of the apparatus for validating.

As shown in FIG. 3, an apparatus 10 for validating valuable papers comprises a magnetic sensor 22 of magnetic head or Hall effect element disposed adjacent to a passageway 29, optical sensors 23 to 26 of photocouplers each consisting of a light emitting diode and a light receiving transistor. Magnetic sensor 22 and optical sensors 23 to 26 provide a validating sensor 21 deployed in the proximity of passageway 29 so that a central processing unit or CPU 1 validates authenticity of a valuable paper and produces drive signals to a conveyor 16 in view of outputs from validating sensor 21.

Passageway 29 is defined by conveyor 16 which comprises convey belts 15 wound around drive pulleys 17 and guide walls 15a mounted in parallel relation to convey belts 15. Magnetic sensor 22 detects ferrous ink printed in a predetermined position on valuable paper. An optical sensor 23 located adjacent to an inlet 14 detects insertion of valuable paper into inlet 14 and an optical pattern of infrared ray penetrating the paper. For instance, optical sensor 23 comprises a light emitting diode 23a secured to lower frame 30 of validating apparatus 10 and a light receiving transistor 23b secured on upper frame 31.

Upper frame 31 is rotatably connected to lower frame 30 through a hinged structure not shown to upwardly open an end of upper frame 31 away from lower frame 30 to remove a jammed paper in passageway 29. Lower and upper frames 30, 31 form an entire frame of validating apparatus 10. Each of optical sensors 24, 25 comprises a light emitting diode and a light receiving transistor and a case for accommodating these light emitting and receiving elements to receive lights reflected on upper and bottom surfaces of the paper by each light receiving transistor. Optical sensor 26 comprises a light emitting diode 26a secured to lower frame 30 and a light receiving transistor 26b secured to upper frame 31 to detect permeation pattern of infrared ray penetrating the paper and thereby to sense passage and moved position of the paper.

A pinch roller 27 pushes the paper on magnetic sensor 22 to positively detect magnetic signals from the paper by magnetic sensor 22. Rotatably mounted on lower frame 30 are drive pulleys 17 around which convey belts 15 are wound, and rollers 32, 33 are rotatably attached to upper frame 31 opposite to drive pulleys 17 to push the paper on convey belts 15 by rollers 32, 33. Also, rotatably mounted around a shaft 35 behind optical sensor 25 is a lever 34 for detecting passage of paper, and to this end, one end of lever 34 is so resiliently drawn by a spring 36 that the other end of lever 34 projects into passageway 29. Passing lever 34 along passageway 29, the paper forcibly rotates lever 34 in the clockwise direction against resilient force of spring 36 to allow passage of the paper over lever 34. At the moment, rotation of lever 34 is detected by a lever sensor 37 of photosensor. Thus, the paper is transported along passageway 29 from inlet 14 through outlet 20 to a stacker 29 attached over validating apparatus 10.

As shown in FIG. 4, validating sensor 21 and lever sensor 37 are electrically connected to corresponding input terminals of (input device) CPU 1 whose output terminals (output device) are electrically connected to conveyor 16. CPU 1 comprises a one-chip micro-computer of such as large scale integrator (LSI) or discrete circuits to generate command outputs from output terminals in response to input signals received by input terminals. Conveyor 16 produces outputs for driving and controlling convey motor 32. CPU 1 receives from validating sensor 21 output signals representing optical or magnetic feature of the paper to compare the output signals from validating sensor 21 with a predetermined optical or magnetic pattern previously stored in a memory location 19 in existent memory 12. When output signals from validating sensor 21 correspond to information stored in memory location 19, CPU 1 produces outputs to conveyor 16 which forwards drive signals to convey motor 32 to transport the paper to outlet 20.

CPU 1 of validating apparatus 10 shown in FIG. 4, comprises an input device (not shown) electrically connected to validating sensor 21 and lever sensor 37 and an output device (not shown) electrically connected to conveyor 16. CPU 1 is electrically connected to existent memory 12 for storing operational information to produce program-controlled command signals from output device of CPU 1 in response to input signals received by input device of CPU 1 in accordance with the operational information stored in existent memory 12. Although the embodiment of validating apparatus 10 shows connection of validating sensor 21 and lever sensor 37 to input device of CPU 1 and connection of conveyor 16 to output device of CPU 1, variations in setting these elements can be made as necessary. Existent memory 12 comprises a memory control device 13 that has memory location 19 for storing operational program to transport the paper, acquire data from the paper and validate the paper, and an information memory 18 for storing addresses for information stored in memory location 19. CPU 1 comprises a control system for computing and controlling which includes control terminals for producing retrieval signals to existent memory 12, an inner memory for storing access space, and registers for temporarily retaining address and information. Address bus of lines A0-A15 is provided to transmit address signals from CPU 1 to existent memory 12, and a data bus to transmit data from existent memory 12 to CPU 1 so that CPU 1 designates an address stored in information memory 18 of existent memory 12 through address bus to read out, through data bus, information stored in memory location 19 to which addresses are assigned, and then, CPU 1 produces command signals to control conveyor 16 from output device of CPU 1 based on the fetched information.

Operation of CPU 1 and existent memory 12 is described hereinafter. FIG. 5 is a flow chart showing an operational sequence from insertion to stacking of the paper. When power switch 38 is turned on in Step 61 to supply electric power from power source 11, a reset signal is given to CPU 1 to initialize validating apparatus 10, and at the same time, CPU 1 forwards a first retrieval signal from RD output terminal to OE input terminal of existent memory 12 which therefore is turned into the readable mode. Then, CPU 1 accesses information memory 18 through address bus A0-A15 to gain information from memory location 19 to make preparations for receiving a paper. When the paper is inserted into inlet 14, inlet sensor 23 detects insertion of the paper in Step 62. When input device of CPU 1 receives a detection signal from inlet sensor 23, CPU 1 generates a retrieval signal to OE input terminal of existent memory 12 from RD output terminal of CPU 1 so that CPU 1 receives from existent memory 12 program necessary for conveying paper from inlet 14 along passageway 29 in validating apparatus 10, and to provide conveyor 16 with command signals from output device of CPU 1. Arriving at Step 63, the paper moved by conveyor 16 passes validating sensor 21 while magnetic sensor 22 and optical sensors 24 to 26 detect magnetic and optical features of the moving paper.

CPU 1 compares detected information from the paper with denomination information stored in memory location 19 of existent memory 12 (in Step 64) to determine correct denomination or kind of the paper (in Step 65). When the correct paper denomination is decided in Step 65, processing moves to Step 66 wherein CPU 1 compares detected information from the paper with information of the genuine document or paper previously stored in memory location 19 to validate authenticity of the paper. When CPU 1 validates and regards the paper as genuine in Step 67, it sends conveyor 16 command signals to drive convey motor 32, transport the paper along passageway 29 and put the paper in stacker 28 (in Step 68). When CPU 1 decides that the denomination of the paper is different from that stored in memory location 19 in Step 65 or when CPU 1 determines that the paper is not genuine in Step 67, conveyor 16 is driven in the adverse direction to return the paper to inlet 14 (Step 69).

By the way, in such a prior art validating apparatus 10, CPU 1 must be operated with different program which includes new validating criteria when new bills or new valuable papers are issued, and moreover, memory location 19 of existent memory 12 must have validating criteria program for existing and new valuable papers because both of them are put into circulation in markets. In such a case, capacity of memory location 19 in existent memory 12 should be enlarged if the existent memory capacity is too small to install the expanded program. However, expansion of memory capacity would be very difficult because increase of memory capacity in existent memory 12 requires increase of the address number and address bus, and therefore, CPU 1 as well as existent memory 12 had to be exchanged for new one.

Accordingly, an object of the present invention is to provide a storage control device of bank structure capable of operating a controlled system connected to a CPU of smaller capacity in accordance with information read out from a large capacity storage to CPU. Also, another object of the present invention is to provide a storage control device of bank structure which comprises an existent memory exchangeable for a large capacity storage without exchanging CPU. Still another object of the present invention is to provide an apparatus equipped with such a storage control device for validating valuable papers.

SUMMARY OF THE INVENTION

The storage control device of bank structure according to the present invention, comprises a CPU (1) provided with involved input and output devices, and a storage (2) connected to CPU (1). Storage (2) comprises a memory control device (3) which has a plurality of bank memories (9) each for storing information at the memory capacity for processing by CPU (1), information addresses (00000h-7FFFFh) assigned to information stored in each bank memory and bank addresses (0DF00h-7DF07h) assigned to each bank memory. CPU (1) produces a retrieval signal for switching memory control device (3) to a next bank memory and timely shifting memory control device (3) into the readable mode so that CPU (1) can read out information from the bank memory switched with one of bank addresses (0DF00h-7DF07h) to produce outputs from output device of CPU (1) in response to input signals received by input device of CPU (1) in accordance with information read from the bank memory. Storage (2) detects and temporarily holds one of bank addresses (0DF00h-7DF07h) for the bank memory to be read out next by CPU (1) when CPU (1) reads the bank memory so that storage (2) supplies the held bank address to memory control device (3) which thereby is switched to a next bank memory when CPU (1) produces a next retrieval signal. Accordingly, by switching one of a plurality of bank memories (9) to another in order, CPU (1) of still small capacity can gain information from switched bank memory for various operation of a controlled system by CPU (1). Accordingly, control functions can be expanded or altered, still utilizing existing devices without altering CPU (1) of small capacity and with exchanging only memory (12) for storage (2).

CPU (1) produces retrieval signals to fetch information from a selected one of bank memories (9) of memory control device (3) so that CPU (1) performs predetermined operations in accordance with information read from selected bank memory, while addressing device (4) detects and temporarily holds a bank address for bank memory to be accessed next by CPU (1). Then, when CPU (1) produces a next retrieval signal, addressing device (4) supplies held bank address to memory control device (3) to positively advance memory control device (3) to a previously designated and successive bank memory (9) so that CPU (1) can receive predetermined information from memory control device (3).

BRIEF DESCRIPTION OF THE DRAWINGS

An embodiment of the present invention applied to an apparatus 10 for validating valuable papers shown in FIG. 3 is described hereinafter in connection with FIGS. 1 to 3. Same symbols as those shown in FIG. 4 are applied to equivalent elements shown in FIG. 1 for omission of repeated explanation on the symbolized elements.

BEST MODE FOR CARRYING OUT THE INVENTION

In the present invention, a large capacity storage 2 can be connected to CPU 1 in place of existent memory 12 connected to CPU 1. An embodiment according to the present invention represents an example of validating apparatus 10 shown in FIG. 3 with CPU 1 and storage 2 substituted for prior art existent memory 12 connected to CPU 1 shown in FIG. 4. Memory capacity of each bank memory is substantially the same as or greater than memory capacity of existent memory 12 connected to CPU 1 before storage 2 is connected to CPU 1, and information stored in a first bank memory 9a may contain the same information as at least a part of information stored in existent memory 12, but may contain quite different information from that in existent memory 12. As shown in FIG. 4, existent memory 12 comprises address bus of sixteen lines A0-A15 and data bus of eight lines D0-D7 with memory capacity of 512 kilobits to which addresses from 00000h-0FFFFh (The symbol "h" indicates a hexadecimal number.) are assigned. Expansion of memory capacity from 512 kilobits to 4 megabits requires increase of the address bus number from current sixteen lines A0-A15 to nineteen lines A0-A18. In this embodiment, memory capacity can be expanded by substituting storage 2 for existent memory 12 from 512 kilobits to 4 megabits eight times. Specifically, as shown in the following Table 1, access space (memory capacity) can be enlarged from 512 kilobits with address: 00000h-0FFFFh to 4 megabits with address 00000h-7FFFFh by means of additional address bus of three lines A16-A18 with a first bank memory 9a of 00000h-0FFFFh to an eighth bank memory of 70000h-7FFFFh.

TABLE 1

| Bank Memory | | Bank Address (Binary Notation) | | | Information Address (Hexadecimal Notation) |
|---|---|---|---|---|---|
| | | A18 | A17 | A16 | |
| 9a | First | 0 | 0 | 0 | 00000h~0FFFFh |
| 9b | Second | 0 | 0 | 1 | 10000h~1FFFFh |
| 9c | Third | 0 | 1 | 0 | 20000h~2FFFFh |
| 9d | Fourth | 0 | 1 | 1 | 30000h~3FFFFh |
| 9e | Fifth | 1 | 0 | 0 | 40000h~4FFFFh |
| 9f | Sixth | 1 | 0 | 1 | 50000h~5FFFFh |
| 9g | Seventh | 1 | 1 | 0 | 60000h~6FFFFh |
| 9h | Eighth | 1 | 1 | 1 | 70000h~7FFFFh |

Incidentally, CPU 1 utilizes only an access space of 00000h-0FFFFh with address bus of sixteen lines A0-A15 and data bus of eight lines D0-D7.

Figure 1:
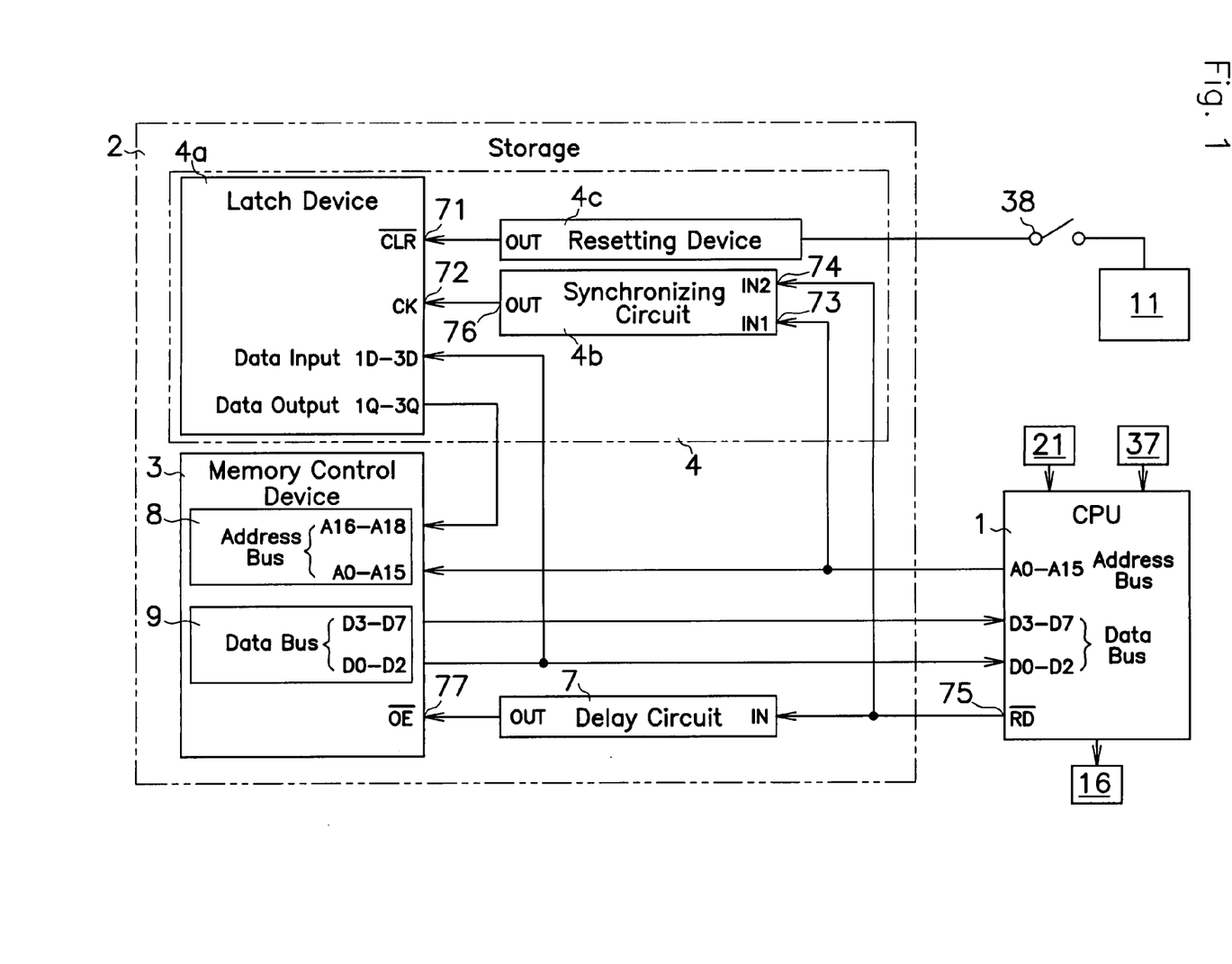
FIG. 1 is a block diagram of an embodiment showing the storage control device of bank structure according to the present invention.

As shown in FIG. 1, the storage control device of bank structure according to the present invention, comprises a CPU 1 and a storage 2 connected to CPU 1 available without its any alteration in the form shown in FIG. 4. Storage 2 employs ROM (non-volatile Read Only Memory) or EPROM (non-volatile Electrically Programmable Read Only Memory). Storage 2 comprises a memory control device 3 which has eight bank memories 9 each for storing information at the memory capacity for processing by CPU 1, information addresses 00000h-7FFFFh assigned to information stored in bank memories 9 and bank addresses 0DF00h-7DF07h assigned to each of bank memories 9. Storage 2 also comprises an addressing device 4 connected to CPU 1 and memory control device 3, and addressing device 4 comprises a latch device 4a, a synchronizing circuit 4b and a resetting device 4c.

Latch device 4a detects and temporarily holds one of bank addresses 0DF00h-7DF07h for bank memory to be read out next by CPU 1 to supply the held bank address to memory control device 3 which thereby is switched to next bank memory when CPU 1 produces a next retrieval signal. Eight bank memories 9 of memory control device 3 store information to be sent to CPU 1 and bank addresses 0DF00h-7DF07h in hexadecimal notation of bank memory to be read out one after another when each bank memory is accessed by CPU 1. When CPU 1 produces a next retrieval signal, latch device 4a converts bank address stored in hexadecimal notation into binary notation, and then designates a next bank memory through bank address bus of lines A16-A18 in memory control device 3. CPU 1 produces command signals to the controlled system from output device of CPU 1 in accordance with information supplied from one of bank memories 9 of memory control device 3 in response to input signals received by input device of CPU 1.

A synchronizing circuit 4b provides latch device 4a with a synchronizing signal in accordance with a retrieval signal from CPU 1 so that latch device 4a furnishes memory control device 3 with one of bank addresses 0DF00h-7DF07h to designate a next bank memory upon receiving a synchronizing signal from synchronizing circuit 4b. When memory control device 3 is switched to a next bank memory, CPU 1 receives information from the next bank memory switched by forwarding one of information addresses 00000h-7FFFFh to memory control device 3 through address bus of sixteen lines A0-A15 while latch device 4a discriminates and temporarily retains a further next third bank address 0DF00h-7DF07h contained in previous bank memory.

Resetting device 4c comprises a pulse generator such as a differentiating circuit for generating a reset pulse when power switch 38 is turned on to supply electric power to resetting device 4c from power source 11. Upon receiving reset pulse from resetting device 4c, latch device 4a is designed under programmed control to automatically select therein bank address for designating a first bank memory 9a to be first read out from bank memories 9, and forwards to memory control device 3 the bank address through bank address bus of lines A16-A18. Delay circuit 7 transmits retrieval signal from RD output terminal 75 of CPU 1 to OE input terminal 77 of memory control device 3 with time delay to defer shifting of memory control device 3 to the readable mode so that delay circuit 7 provides a timer which controls timing of latch device 4a for starting receiving and temporarily retaining one of bank addresses 0DF00h-7DF07h from memory control device 3. CPU 1 performs necessary operations in accordance with information from first bank memory 9a, and produces a retrieval signal from RD output terminal 75 when CPU 1 finishes its operations. Retrieval signal from CPU 1 causes synchronizing circuit 4b to produce a synchronizing signal which activates latch device 4a to convert retained one of bank addresses 0DF00h-7DF07h in hexadecimal notation into binary notation which is then forwarded to bank address bus A16-A18 of memory control device 3 so that in turn memory control device 3 is switched to and holds a next secondly designated bank memory. Accordingly, CPU 1 forwards an information address of 00000h-7FFFFh through address bus A0-A15 to the secondly designated bank memory to receive information stored in the secondly designated bank memory and carry out operations in accordance with the information.

As bank address of 0DF00h-7DF07h for next one of bank memories 9 to be accessed by CPU 1 have been written in preceding one of bank memories 9 previously accessed by CPU 1, latch device 4a detects and temporarily keeps read one of bank addresses 0DF00h-7DF07h written in preceding one of bank memories 9 when CPU 1 reads content stored in bank memory. Receiving a synchronizing signal from synchronizing circuit 4b, latch device 4a converts retained one of bank addresses 0DF00h-7DF07h from hexadecimal to binary notation, and then delivers the bank address to bank address bus of A16-A18 to switch memory control device 3 to a subsequent bank memory.

Operation is described hereinafter in connection with the storage control device of bank structure according to the present invention applied to validating apparatus 10 shown in FIG. 3.

Figure 2:
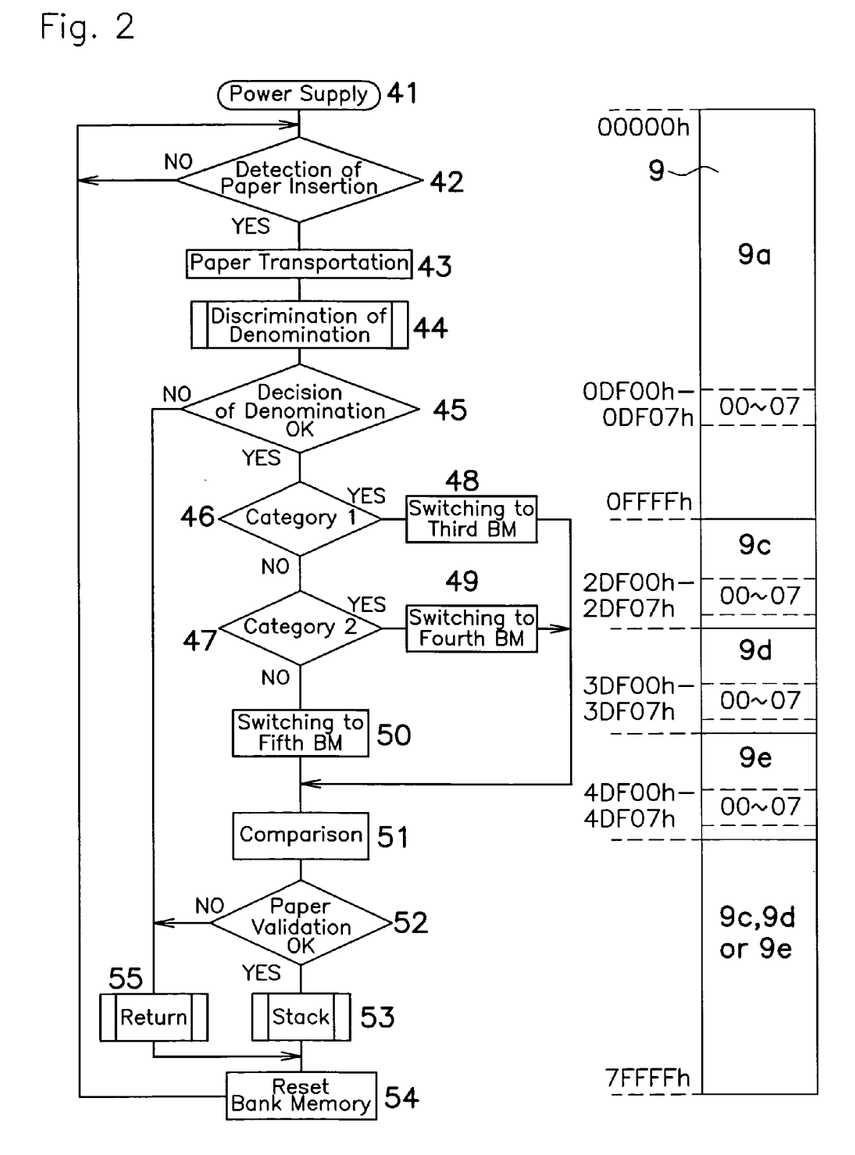
FIG. 2 is a flow chart showing an operational sequence of an apparatus for validating valuable papers.

In the electric circuit shown in FIG. 2, when power switch 38 is turned on in Step 41 to supply electric power to resetting device 4c from power source, resetting device 4c produces from the output terminal a reset signal of high level to a CLR (clear) terminal 71 of latch device 4a. Reset signal to CLR terminal 71 of latch device 4a causes low level voltage at all of data output terminals 1Q-3Q of latch device 4a. At the same time, CPU 1 is reset to produce retrieval signal from RD output terminal 75 so that CPU 1 forwards address signal of 0DF00h-0DF07h to input terminal IN1 73 of synchronizing circuit 4b and simultaneously gives retrieval signal from RD output terminal 75 to input terminal IN2 74 of synchronizing circuit 4b. Thereby, synchronizing circuit 4b generates a clock signal from output terminal 76 to furnish CK (clock) terminal 72 of latch device 4a with leading rise edge of the clock signal. At this moment, as all data output terminals 1Q-3Q of latch device 4a remain in a low level, information of low level is sent from data output terminals 1Q-3Q to bank address bus of lines A16-A18 of memory control device 3. Simultaneously, as retrieval signal is applied on OE input terminal 77 of memory control device 3 through delay circuit 7 to shift memory control device 3 to first bank memory 9a. Since output signals are kept on data output terminals 1Q-3Q until a next rising signal is loaded on CK terminal 72 of latch device 4a from synchronizing circuit 4b, CPU 1 can access only address range of 00000h-0FFFFh for first bank memory 9a denoted immediately after supply to electric power as shown in Table 1.

As latch device 4a of storage 2 receives bank address signals of 0DF00h-7DF07h afforded from memory control device 3 to temporarily retain the bank address, CPU 1 can read out information from unchanged memory control device 3 within sufficient time interval. In other words, each time banks are switched to a next bank memory, latch device 4a holds one of bank addresses 0DF00h-7DF07h for the next bank memory to which CPU 1 can access. Latch device 4a initially designates a first bank memory 9a which stores a protocol for subsequently selecting and assigning any one of third to fifth bank memories 9c to 9e. Information stored in first bank memory 9a is sent from storage 2 through data bus D0-D2 of bank memory to CPU 1 which receives and processes the information from storage 2 to produce controlled command signals from output device of CPU 1 for operating the controlled system. As first bank memory 9a involves protocol information which indicates one of bank addresses 0DF00h-7DF07h to designate a successive bank memory in hexadecimal notation, this bank address for designating the successive bank memory is detected by and temporarily retained through data input terminals 1D-3D in latch device 4a. Receiving clock signals from synchronizing circuit 4b, latch device 4a converts into binary notation any one to be designated next of bank addresses 0DF00h-7DF07h for third to fifth bank memories 9c to 9d in hexadecimal notation so that latch device 4a forwards the bank address in binary notation from data output terminals 1Q-3Q to bank address bus of A16-A18 in memory control device 3. In other words, unless receiving a clock signal from synchronizing circuit 4b, latch device 4a never forwards to bank address bus of A16-A18 the bank address in binary notation for any one to subsequently be appointed of third to fifth bank memories 9c to 9e.

Under the circumstances, when a paper is inserted into inlet 14 of validating apparatus 10, as shown in FIG. 2, inlet sensor 23 detects insertion of the paper (in Step 42) to produce a detection signal to CPU 1 which carries out program, and therefore, transports the paper, detects the optical and magnetic features of the paper and validates the paper in view of information stored in first bank memory 9a.

In this case, CPU 1 initially reads information from first bank memory 9a to forward to conveyor 16 command signals by protocol stored in first bank memory 9a so that the paper inserted into inlet 14 is transported along passageway 29 in validating apparatus 10 while CPU 1 performs program stored with address ranges 00000h-0FFFFh for discriminating denomination of the paper. With movement of processing from Step 42 to Step 43, CPU 1 drives convey motor 32 of conveyor 16 to transport the paper along passageway 29 so that magnetic or optical sensor 22, 24 to 26 of validating sensor 21 detects and delivers magnetic or optical feature of the paper to CPU 1. Then, CPU 1 compares discerned information from the paper with denomination information stored in first bank memory 9a (in Step 44) to decide denomination of the paper (in Step 45).

As shown in FIG. 2, each bank memory stores necessary operational information 00-07 and bank address (protocol) in hexadecimal notation to designate a next bank memory, and an address of 0DF00h-0DF07h to 7DF00h-7DF07h is assigned to each operational information per bank memory. CPU 1 accesses bank address of 0DF00h-0DF07h to 7DF00h-7DF07h from memory control device 3 through address bus A0-A15 and extracts information 00-07 to perform the operation under programmed control.

As shown in FIG. 2, when the paper comes under Category 1 in Step 46, processing moves to Step 48 in which memory control device 3 is switched from first bank memory 9a to third bank memory 9c, and then the subsequence comes to Step 51. When the paper does not fall under Category 1 in Step 46, processing moves to Step 47 in which decision is made on whether the paper comes under Category 2 or not. In Step 47, when CPU 1 decides that the paper corresponds to Category 2, processing moves to Step 49 in which memory control device 3 is switched from first bank memory 9a to fourth bank memory 9d, and the subsequence comes to Step 51.

When memory control device 3 is switched from first bank memory 9a to third bank memory 9c, CPU 1 causes bank addresses 0DF00h-0DF07h to enter into input terminal IN1 73 of synchronizing circuit 4b, and simultaneously also supplies input terminal IN2 74 of synchronizing circuit 4b with retrieval signal from RD output terminal 75 of CPU 1. Thus, synchronizing circuit 4b produces a clock signal from output terminal 76 to give CK terminal 72 of latch device 4a a leading rise edge of the clock signal so that latch device 4a converts stored information in hexadecimal notation from third bank memory 9c to be successively designated into the information of binary notation which is then forwarded to memory control device 3 through bank address bus A16-A18 because latch device 4a has already held the information through data input terminals 1D-3D from third bank memory 9c of memory control device 3. At the same time, retrieval signal is applied to OE input terminal 77 of memory control device 3 through delay circuit 7, and memory control device 3 is switched from first bank memory 9a to third bank memory 9c so that CPU 1 accesses and reads third bank memory 9c through address bus A0-A15 (in Step 48) to gain information of address 2000h-2FFFFh from memory control device 3 in case the paper is of the denomination already appreciated in Step 45 and belongs to Category 1 in Step 46, and then the processing comes to Step 51.

Memory control device 3 ceases the readable mode to stop outputting information, the instant that CPU 1 terminates the retrieval signal. Latch device 4a provides bank address signals in binary notation for bank address bus A16-A18 of memory control device 3 from address output terminals 1Q-3Q when synchronizing circuit 4b produces a synchronizing signal to CK terminal 72 of latch device 4a. If memory control device 3 ceases the readable mode before bank address signals are provided to bank address bus A16-A18, there would disadvantageously be a likelihood of memory control device 3 unable to be switched to a next bank memory although latch device 4a applies bank address signal from data output terminals 1Q-3Q to address bus A16-A18 of memory control device 3. To this end, delay circuit 7 defers timing of a switching signal supplied from CPU 1 to OE input terminal 77 of memory control device 3 to surely switch memory control device 3 to a next bank after memory control device 3 receives bank address signal from latch device 4a.

Third, fourth and fifth bank memories 9c to 9e store new or additional information for a genuine valuable paper or papers. In accordance with protocol retained at data output terminals 1Q-3Q, CPU 1 can access information stored in third bank memory 9c with address of 20000h-2FFFFh. Third bank memory 9c stores information 00-07 in hexadecimal notation to which bank address 2DF00h-2DF07h is allocated, and latch device 4a holds and retains information 00-07 of third bank memory 9c which is converted into binary notation when switching third bank memory 9c is switched to a next bank memory.

In a similar manner for switching memory control device 3 from first bank memory 9a to third bank memory 9c, memory control device 3 is switched from first bank memory 9a to fourth bank memory 9d in Step 49 while CPU 1 supplies bank address 0DF00h-0DF07h to input terminal IN1 73 of synchronizing circuit 4b, and at the same time furnishes retrieval signal from RD output terminal 75 to input terminal IN2 74 of synchronizing circuit 4b. Thus, synchronizing circuit 4b again generates a clock signal to present a leading rise edge of clock signal to CK terminal 72 of latch device 4a which retains information 00-07 of fourth bank memory 9d in hexadecimal notation at data input terminals 1D-3D for next designation so that latch device 4a converts information 00-07 into information of binary notation and forwards it from data output terminals 1Q-3Q to bank address bus A16-A18 of memory control device 3. Simultaneously, retrieval signal is applied to OE input terminal 77 through delay circuit 7, and memory control device 3 is switched from first bank memory 9a to fourth bank memory 9d which is accessed by CPU 1 (in Step 49) in case the paper is of the denomination already appreciated in Step 45 and belongs to Category 2 as shown in FIG. 2. In accordance with protocol retained in data output terminal 1Q-3Q, CPU 1 can have access to information stored in fourth bank memory 9d with information address 30000h-3FFFFh. Fourth bank memory 9d stores information 00-07 with bank address 3DF00h-3DF07h which is supplied to data input terminals 1D-3D of latch device 4a which retains information 00-07 of fourth bank memory 9d and utilizes it to switch memory control device 3 from fourth bank memory 9d to a next bank memory. CPU 1 has access to information with information address 30000h-3FFFFh of memory control device 3 through address bus A0-A15, and then processing moves to Step 51.

When CPU 1 decides that the paper does not come under Category 2 in Step 47, memory control device 3 is switched from first bank memory 9a to fifth bank memory 9e in Step 50. In accordance with a similar operation to that for switching first bank memory 9a to third bank memory 9c or first bank memory 9a to fourth bank memory 9d, memory control device 3 is switched from first bank memory 9a to fifth bank memory 9e so that CPU 1 can have access to fifth bank memory 9e with information address of 40000h-4FFFFh, and simultaneously latch device 4a receives at the data input terminals 1D-3D information 00-07 in fifth bank memory 9e with bank address 4DF00h-4DF07h. After a bank memory is switched in accordance with any Category of the paper, CPU 1 performs program stored in each bank memory to compare information on the paper output from validating sensor 21 with information on genuine paper previously stored in third, fourth or fifth bank memory 9c, 9d or 9e for validation of the paper.

Referring to Step 52, CPU 1 validates authenticity of the paper, and when CPU 1 decides the paper as genuine, it produces a command signal to conveyor 16 in Step 53. Accordingly, the paper is conveyed to stacker 28 with rotation of convey motor 32 controlled by conveyor 16, and arranged in stacker 28 secured over validating apparatus 10 (in Step 53), and processing moves to Step 54 for resetting bank memories 9. On the other hand, when CPU 1 decides in Step 45 that the paper does not correspond to denomination stored in first bank memory 9a or when CPU 1 decides in Step 52 that the paper is not genuine, CPU 1 drives conveyor 16 in the adverse direction in Step 55 to return the paper to inlet 14, and the process goes to Step 54. In Step 54, bank memory is switched to first bank memory 9a to return operation of validating apparatus 10 to Step 42. As mentioned above, in the embodiment of the present invention, retrieval signal produced by CPU 1 switches memory control device 3 to a next bank memory and simultaneously shifts memory control device 3 to the readable mode so that CPU 1 reads information from the switched bank memory with bank address of 0DF00h-7DF07h to generate outputs from output device of CPU 1 to controlled system in accordance with information from each bank memory in response to input signals received in input device of CPU 1.

Storage 2 detects and holds one of bank addresses 0DF00h-7DF07h stored in a previous bank memory for a bank memory to be read out next when CPU 1 reads a bank memory, and supplies memory control device 3 with the retained bank address to switch memory control device 3 to the next bank memory, CPU 1 of even small processing capacity can operate the controlled system in various modes by obtaining information from plural bank memories 9 switched one after another in a predetermined order. Accordingly, without altering an existing CPU 1 of small processing capacity and with exchange of only existent memory 12 for storage 2, control function can be expanded or altered utilizing existing devices. In this case, existing CPU 1 can still be used for extremely increased control information by substituting storage 2 for existent memory 12 connected to CPU 1 because storage 2 may have a memory control device 3 for storing information with the memory capacity several times as much as that of existent memory 12.

The foregoing embodiment of the present invention can be changed in various ways, and the present invention should not be limited to the foregoing embodiment. For example, the storage control device of bank structure according to the present invention may be applied to an apparatus for validating valuable papers, and would be applicable to money handling apparatus for paper currency or coins such as money counters, cash registers such as electronic registers, leisure apparatuses such as token dispensers, customer or industrial appliances. The preceding embodiment does not show utilization of second, sixth to eighth bank memories 9b, 9f to 9h for basic operation, however, it is apparent that these memories may store information, judgment criteria and program for performing operation now shown for reading and execution by CPU 1. In short, the embodiment simply shows an example of bank memories 9. Bank memories may store bank address to be read out next in binary notation, not hexadecimal notation so that latch device 4a temporarily detects and holds the bank address in binary notation. In this case, latch device 4a does not need conversion of notation when it produces bank address from data output terminals 1Q-3Q to memory control device 3. Latch device 4a receives bank address information through data input terminals 1D-3D and retains it in hexadecimal notation for bank memory 9c to be designated next. If bank address bus A16-A18 has their sufficient capacity, bank address information is not converted into binary notation, and it can be forwarded in its hexadecimal notation to bank address bus A16-A18 for designation of a next bank memory.

AVAILABILITY IN INDUSTRY

The storage control device of bank structure according to the present invention utilizes CPU of small capacity for various operation of a controlled system by CPU, and for provision of the device in smaller size. Also, major alterations can be made to operational program of CPU without altering existing CPU of small capacity and with exchanging only memory for storage. For that reason, existing devices can be successively used without the disposal with expanded or changed control functions for saving of resources and energy. Moreover, the validating apparatus according to the present invention can save or reduce cost for improvement of the apparatus when new valuable papers are issued.

What is claimed is:

1. An apparatus for validating valuable papers comprising:
   a conveyor for transporting valuable papers inserted into an inlet along a passageway;
   a validating sensor for detecting at least one optical or magnetic feature of the transported paper;
   a large capacity storage for previously storing information of the papers to produce an output of paper information; and
   a central processing unit connected to said validating sensor and large capacity storage for receiving the paper information from said validating sensor and information from the large capacity storage to compare the paper information with the information stored in the large capacity storage, validate authenticity of the papers and determine denomination of the papers in order to control said conveyor;
   said large capacity storage comprising a memory control device connected to said central processing unit and an addressing device connected to said memory control device;
   said memory control device comprising a plurality of bank memories each for storing information with the memory capacity addressable by said central processing unit and for supplying to said central processing unit the stored information with information address supplied from said central processing unit; and an information memory for storing the information addresses assigned to the information stored in each bank memory and bank addresses assigned to each bank memory, said bank address being contained in the information given from each bank memory to said central processing unit;
   wherein said addressing device comprises means for detecting and temporarily holding the bank address of the bank memory to be switched next, and means for forwarding the temporarily held bank address to said memory control device to switch the memory control device to the next bank memory when said central processing unit produces a switching signal;
   wherein said central processing unit comprises executing means for carrying out programs for transporting and validating the paper inserted into the inlet in view of the information stored in the bank memories; and
   further comprising CPU switching means for switching said memory control device from a current bank memory to one of the other bank memories to read out the information on genuine paper from said one of the other bank memories to said central processing unit for validating authenticity of a different paper coming under Category 1 or 2 so that said central processing unit validates authenticity of the paper in view of information on genuine paper read out from said one of the other bank memories.

2. The apparatus of claim 1, wherein said addressing device further comprises a switching means for switching said memory control device from the current bank memory to said one of the other bank memories to read out the information on genuine paper from said one of the other bank memories to said central processing unit for validating authenticity of the different paper coming under or out of Category 1 or 2 so that said central processing unit validates authenticity of the paper in view of the information on genuine paper read out from said one of the other bank memories.

3. The apparatus claim 1, wherein Categories 1 and 2 come respectively under existing and new valuable papers.

4. The apparatus of claim 1, wherein said central processing unit carries out programs for transporting, detecting and validating the paper inserted into an inlet in view of the information stored in said one of the other bank memories.

5. The apparatus of claim 1, wherein the memory capacity of each bank memory is substantially the same as or larger than that of an existent memory previously equipped in said storage control device; and wherein the information stored in said current bank memory is the same as at least one part of information stored in said existent memory.

6. The apparatus of claim 1, wherein said addressing device comprises a latch device connected to said memory control device,
   said latch device comprises said means for detecting and temporarily holding the bank address of the bank memory to be next read out when the information stored in each bank memory is read out to said central processing unit,
   and means for supplying to said memory control device the held bank address of the bank memory to be next assigned to switch said memory control device to the next bank memory when said central processing unit produces a switching signal.

7. The apparatus of claim 6, further comprising a synchronizing circuit for providing said latch device with a synchronizing signal in accordance with the switching signal from said central processing unit;
   wherein said latch device comprises means for furnishing said memory control device with the bank address of the bank memory to be next designated upon receiving the synchronizing signal from said synchronizing circuit.

8. The apparatus of claim 6, further comprising a resetting device for providing said latch device with a reset signal upon supply of electric power;
   wherein said latch device comprises means for automatically selecting the bank address for designating the first bank memory to be first read out of said bank memories upon receiving a reset signal from said resetting device, and forwarding means for forwarding the bank address to a bank address bus of said memory control device when said central processing unit produces the switching signal.

9. The apparatus of claim 1, further comprising a delay circuit for transmitting the switching signal from said central processing unit with delay to said memory control device to defer switching of said memory control device to the readable mode.

* * * * *